United States Patent Office 2,949,269
Patented Aug. 16, 1960

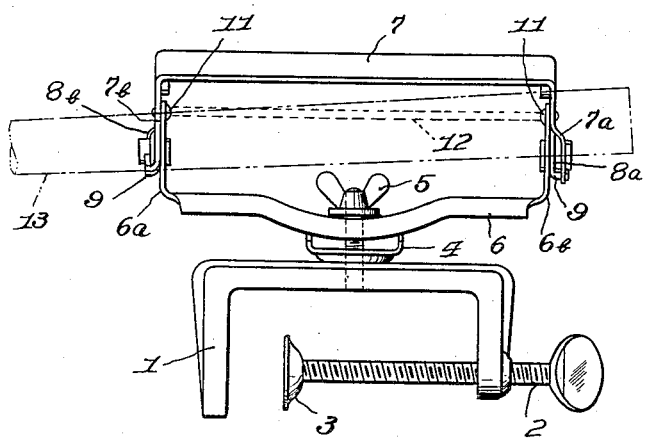
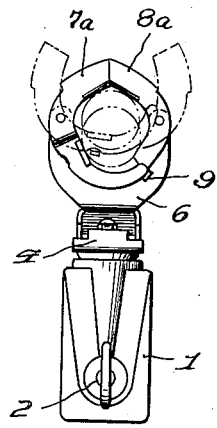
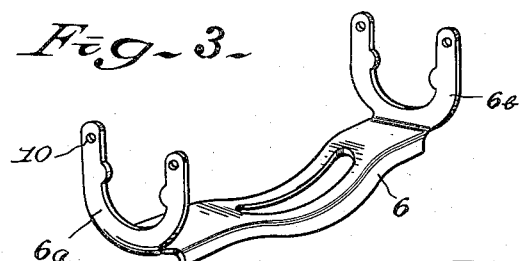
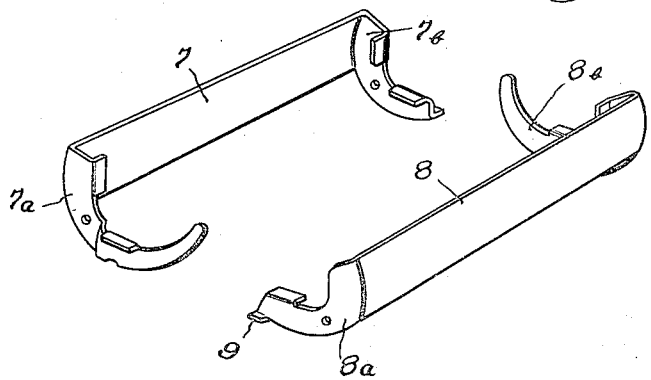

2,949,269

FISHING-ROD HOLDER

Senkichiro Kimura, No. 8, 5-Chome, Terashima-cho, Sumida-ku, Tokyo-to, Japan

Filed July 11, 1956, Ser. No. 597,243

Claims priority, application Japan Dec. 20, 1955

3 Claims. (Cl. 248—41)

An important object of this invention is to provide a fishing-rod holder, in which the insertion and removal of a fishing-rod may be carried out in a simple manner by a mere raising and lowering of said rod by hand and wherein said rod may be effectively held even when violent vibration is applied to the holder.

The novel features which I believe to be characteristic of my invention are set forth with particularity in the appended claims. My invention itself, however, both as to its construction and manner of handling together with further objects and advantages thereof, may best be understood by reference to the following description, taken in connection with the accompanying drawing, in which:

Figure 1 is a side view of an example of this invention;

Figure 2 is a back view of the example shown in Figure 1;

Figure 3 is a perspective view of the U-shaped member in the example shown in Figures 1 and 2;

Figure 4 is perspective views of the frame plates in the example shown in Figures 1 and 2.

Referring to figures of the drawing, in one arm of an inverted U-shaped fixing metal member 1 is screwed a fixing screw 2 provided with a pushing head 3 at the end thereof.

A U-shaped member 6 having front and rear forked arms 6a and 6b provided with holes 10 in the forked legs is fixed to said member 1 at the center portion thereof by means of a butterfly nut 5 screwed on a threaded pin which is fixed to said member 1 and is passed through said member 1 and a guide member 4.

Arcuate segments 7a and 7b are connected by a frame plate 7 as one body and the other arcuate segments 8a and 8b are connected by another frame plate 8 as one body. Each of the said segments 7a and 8a is rotatably pivoted to each leg of the arm 6b at its hole 10 by a rivet 11.

Similarly, each of the said segments 7b and 8b is rotatably pivoted to each leg of the arm 6a at its hole 10 by a rivet 11.

Each of the segments 8a and 7b is provided with a lug piece 9 which is projected in the direction perpendicular to the segment surface, said lug piece being used as the guide for supporting outside periphery of the opposite segments 7a or 8b so as to stabilize the positions of a pair of said segments during movable and stationary states of said segments.

The manner of employing the fishing-rod holder according to the invention is as follows:

When a fishing-rod 13 shown by chain line in Fig. 1 is placed horizontally in said holding frame plates 7 and 8 under such opening states of two pairs of the arcuate segments as shown in Figure 2 by chain line, said segments are pushed downwards by self-weight of the fishing-rod. Accordingly, two pairs of said segments close and the fishing-rod takes the position such as shown in Figures 1 and 2 by chain line. In this case, the fishing-rod inclines so that the front end thereof takes a position lower than the rear end thereof, because the tension of the fishing-line and the weight of the fishing-rod are applied to said front end.

For the removal of the fishing-rod from the holder, it is only necessary to raise up said rod by hand, because both arcuate segments of each pair can be easily opened.

In this invention, pivotal attachment of the arcuate segments may be, with same effects and operation manner, actualized by using two shafts such as shown by the numeral 12 in Figure 1 by broken line, each of said shafts being rigidly fixed at both ends thereof to one side leg of the front and rear arms 6a and 6b of the member 6 and on each ends of said shafts being rotatably pivoted each pair of said segments so as to be opened and closed. In this case, when said shafts are rotatably supported by the holding legs, the arcuate segments may be fixed to said shafts.

According to this invention, as clear from the above description, putting and removal of the fishing-rod can be carried out very simply and the arcuate segments are maintained in the closed condition so far as the fishing-rod is put on said segments, so that holding of said rod can be effectively secured even when any violent oscillation is applied to the holder.

While I have described and shown a particular embodiment of my invention, it will, of course, be understood that I do not wish to be limited thereto, since many modifications may be made and I, therefore, contemplate by the appended claims to cover all such modifications as fall within the true spirit and scope of my invention.

I claim as my invention:

1. Device for holding a fishing rod which comprises a U-shaped holder having front and rear fork-shaped holding arms, each of said arms having a pivot hole therein, a pair of arcuate segments each pivoted to one front arm at said pivot holes, another pair of arcuate segments each pivoted to one of said rear arms at said pivot holes, each pair of segments being adapted to receive a fishing rod therebetween, a pair of plates, each connecting a front and rear segment on the same side, respectively, of said holder, and a lug piece integral with one of said segments and extending perpendicularly from said segment for guiding the adjacent segment to enclose an inserted fishing rod in response to the force exerted by the weight of said rod on said segments.

2. Device for holding a fishing rod which comprises a U-shaped holder having front and rear fork-shaped holding arms, each of said arms having a pivot hole therein, a pair of arcuate segments each pivoted to one front arm at said pivot holes, another pair of arcuate segments each pivoted to one of said rear arms at said pivot holes, each pair of segments being adapted to receive a fishing rod therebetween, a pair of plates, each connecting a front and rear segment on the same side, respectively, of said holder, a shaft fixed at its both ends to one pair of said arms on one side of said holder, another shaft fixed at its both ends to another pair of said arms on the other side of said holder and a lug piece integral with one of said segments and extending perpendicularly from said segment for guiding the adjacent segment to enclose an inserted fishing rod in response to the force exerted by the weight of said rod on said segments.

3. Device for holding a fishing rod which comprises a U-shaped holder having front and rear fork-shaped holding arms, each of said arms having a pivot hole therein, a pair of arcuate segments each pivoted to one front arm at said pivot holes, another pair of arcuate segments each pivoted to one of said rear arms at said pivot holes, each pair of segments being adapted to receive a fishing rod therebetween, a pair of plates, each connecting a front and rear segment on the same side, respectively, of said holder, a lug piece integral with one of said segments and extending perpendicularly from said segment for guiding the adjacent segment to enclose an inserted fishing rod in response to the force exerted by the weight of said rod on said segments and means for securing said U-shaped member to a support, said means being adjustable to a plurality of predetermined positions.

References Cited in the file of this patent

UNITED STATES PATENTS

| | | |
|---|---|---|
| 1,807,501 | Alexander | May 26, 1931 |
| 1,963,463 | Hammer | June 19, 1934 |

FOREIGN PATENTS

| | | |
|---|---|---|
| 949,946 | France | Mar. 14, 1949 |